(12) United States Patent
Rotach et al.

(10) Patent No.: US 7,423,226 B2
(45) Date of Patent: Sep. 9, 2008

(54) BALANCE WITH A DRAFT PROTECTION DEVICE

(75) Inventors: Hansjörg Rotach, Effretikon (CH); Roger Leisinger, Zurich (CH); Jean-Christophe Emery, Schworzenbach (CH)

(73) Assignee: Mettler-Toledo AG, Greifensee (CH)

( * ) Notice: Subject to any disclaimer, the term of this patent is extended or adjusted under 35 U.S.C. 154(b) by 617 days.

(21) Appl. No.: 10/993,098

(22) Filed: Nov. 19, 2004

(65) Prior Publication Data

US 2005/0067197 A1   Mar. 31, 2005

Related U.S. Application Data

(63) Continuation of application No. PCT/EP03/50205, filed on May 28, 2003.

(30) Foreign Application Priority Data

May 29, 2002   (EP)   ................. 02100577

(51) Int. Cl.
   *G01G 21/28*   (2006.01)
(52) U.S. Cl. ........................ 177/180; 177/238
(58) Field of Classification Search .......... 177/180, 177/181, 238–244

See application file for complete search history.

(56) References Cited

U.S. PATENT DOCUMENTS

| | | | | |
|---|---|---|---|---|
| 3,633,693 | A | | 1/1972 | Garfinkle ................. 177/178 |
| 4,762,190 | A | | 8/1988 | Meixner .................. 177/181 |
| 4,798,250 | A | | 1/1989 | Knothe et al. ............ 177/181 |
| 4,821,821 | A | * | 4/1989 | Kelley .................... 177/181 |
| 4,856,605 | A | | 8/1989 | Cornelius et al. ....... 177/210 R |
| 4,862,978 | A | | 9/1989 | Borchard ................. 177/180 |
| 4,921,058 | A | * | 5/1990 | Pally et al. .............. 177/181 |
| 5,152,356 | A | | 10/1992 | Strickler et al. .......... 177/180 |
| 5,170,855 | A | * | 12/1992 | Kunz et al. .............. 177/181 |
| 5,485,684 | A | | 1/1996 | Philipp et al. ............ 177/245 |
| 5,583,322 | A | * | 12/1996 | Leisinger et al. ......... 177/180 |
| 6,566,614 | B1 | * | 5/2003 | Fluckiger et al. ......... 177/180 |
| 6,603,081 | B2 | * | 8/2003 | Luchinger ................ 177/126 |
| 6,844,507 | B2 | * | 1/2005 | Leisinger et al. ......... 177/180 |

FOREIGN PATENT DOCUMENTS

CH   677029   3/1991

(Continued)

OTHER PUBLICATIONS

Edward Ruechardt ("Ruechardt"), Light Visible and Invisible, The University of Michigan Press, Ch. 8, 101-109 (1958).*

(Continued)

*Primary Examiner*—Randy W Gibson
(74) *Attorney, Agent, or Firm*—Standley Law Group LLP

(57) ABSTRACT

A balance (1, 101) has a draft protection device (2) that encloses a weighing compartment surrounding the weighing pan (15). A rear wall (22, 122) delimiting the weighing compartment on one side is made of a material (26) that diffuses the transmitted ambient light. The translucent, light-diffusing material (26) is in particular a frosted glass.

16 Claims, 4 Drawing Sheets

FOREIGN PATENT DOCUMENTS

| | | |
|---|---|---|
| CH | 687836 | 2/1997 |
| DE | 3741313 | 7/1988 |
| DE | 8803709 | 10/1988 |
| DE | 198 49 399 A1 | 5/2000 |
| DE | 299 12 867 U1 | 5/2000 |
| DE | 199 48 754 A1 | 5/2001 |
| GB | 182929 | 7/1922 |

OTHER PUBLICATIONS

Kurt Nassau ("Nassau"), The Physics and Chemistry of Color (The Fifteen Causes of Color), John Wiley & Sons, Ch. 11, 232-243 (1983).*

T. Thewlis ("Thewlis"), Concise Dictionary of Physics and Related Subjects, Pergamon Press, 96 (2nd Ed., Rev. 1979).*

Webster's II New Riverside University Dictionary, 376 (1984).*

* cited by examiner

BALANCE WITH A DRAFT PROTECTION DEVICE

CROSS-REFERENCE TO RELATED APPLICATION

This application is a continuation of International Patent Application Serial No. PCT/EP 03/50205 filed May 28, 2003 which, in turn, claims the priority of European Patent Application EP 02100577.2, filed May 29, 2002, both of which are hereby incorporated by reference in their entirety.

BACKGROUND OF THE INVENTION

The invention relates to a draft protection device for a balance, and it also relates to a balance that is equipped with the draft protection device.

The degree of precision that a balance delivers depends on a variety of factors. Of significance are air drafts which during a measurement are acting on the balance pan inside the weighing compartment. Therefore, to avoid undesirable air drafts, balances are in most cases equipped with devices that protect the weighing compartment from the undesirable effects of air drafts.

A draft protection device performing this function is known, e.g., from reference [1], Swiss Patent CH-677 029 A5. The draft protection device described in this reference consists of four or more wall parts that are hinged together. At least one of the wall parts has a U-profiled frame with a plate or windowpane that is slid into the frame so that it can be removed if necessary, for example to perform a so-called weighing-in procedure, or in general to put objects or materials on the balance in order to weigh them. In addition, a lid is hinged at the upper border of the wall part that forms the rear wall of the weighing compartment, offering an additional opening for access to the weighing compartment.

A further draft protection device, disclosed in reference [2], Swiss Patent CH-687 836 A5, is proposed for balances that have a support base, a fixed rear wall connected to the support base, and a front window panel connected to the rear wall by struts. In addition, there are two sliding doors constituting the side walls of the weighing compartment. In the area of their anterior edges, the sliding doors have guide means that reach around linear guiding elements located below the sliding doors.

Reference [3], published German Patent Application DE 198 49 399 A1, discloses a draft protection device that can be releasably connected to the base of a balance by means of a locking device. This draft protection device also offers a simple way of exchanging the draft shield panels, which makes the draft protection device easy to clean.

The known state of the art further includes draft protection devices with motor-actuated elements as disclosed in references [4] and [5], published German Patent Applications DE 37 41 313 A1 and DE 199 48 754 A1.

The device described in [4] has a t least two cylindrically curved wall elements that are movable relative to each other for opening and closing the weighing compartment. The device disclosed in reference [5] has at least two wall elements that can be moved independently of each other by a motorized drive mechanism.

In all of the draft protection devices described in the aforementioned references, the walls surrounding the weighing compartment, in particular the rear wall, are either made of a non-transparent material such as metal, or they consist of a transparent material, preferably glass.

However, a wall that is impassable to the outside light can darken the weighing compartment, while a transparent glass wall has the disadvantage that objects behind the balance are in full view of the operator of the balance, whereby the operator can be distracted from the actual weighing process.

OBJECT OF THE INVENTION

The present invention therefore has on the one hand the objective to optimize a balance in regard to the illumination of the balance compartment and on the other hand to improve the ergonomic design of the balance in regard to undesirable visual interference from objects located outside the balance.

SUMMARY OF THE INVENTION

In a balance according to the invention with a draft protection device that encloses a weighing compartment surrounding the weighing pan, a rear wall that delimits the weighing compartment to one side is made of a material that diffuses the transmitted ambient light, particularly a ground glass (also referred to as frosted glass), so that the weighing compartment can be illuminated advantageously from all sides, particularly from the rear, and that the weighing compartment can be flooded by the ambient light. On the other hand, balance components located behind the rear wall are kept from view so that they cannot cause a visual distraction.

A balance of the foregoing description has a weighing compartment floor that is preferably constituted by the top-side of the balance housing. The rear wall rises substantially vertically from the floor of the weighing compartment.

In a preferred embodiment, a rear wall according to the foregoing concept is equipped with a display, in particular a backlit liquid crystal display. This allows the user to have the weighing pan with the weighing object and the display simultaneously in view. It is also possible to provide an illumination device to light up the rear wall from behind.

In particular, the invention includes the concept that the rear wall is removable and configured so that it can be exchanged against another rear wall.

In a particularly advantageous embodiment of the invention, the draft protection device of the balance has a wind-blocking body consisting of at least two panel elements that reach partially around the weighing compartment. The body can be selectively positioned by hand in at least two different orientations. In each of the differently oriented positions, at least one opening is made available for access to the weighing compartment, where the respective openings resulting from the different positions make the weighing compartment accessible from different directions.

The access openings to the weighing compartment that are created with different placements of the body are preferably equipped with further wind-blocking elements that swivel or slide, for example door elements or a lid that is hinged on the rear wall, so that the access openings can be completely or partially closed. The wind-blocking elements can be permanently installed, or they can be configured so that the user can install them as needed. It is particularly useful if the body in its different positions conforms to the housing of the balance, to the support base and/or to the rear wall and/or to the lid.

The swiveling or sliding wind-blocking elements may in some cases be motor-actuated. Preferably, there is a chamber connected to the rear wall, where the wind-blocking elements can be stowed away when they are not in use. In a preferred embodiment of the invention, the body can be folded and stored likewise inside the chamber.

BRIEF DESCRIPTION OF THE DRAWINGS

Details of the invention will be explained below with references to the drawings, wherein.

DETAILED DESCRIPTION OF PREFERRED EMBODIMENTS

Figure 1:
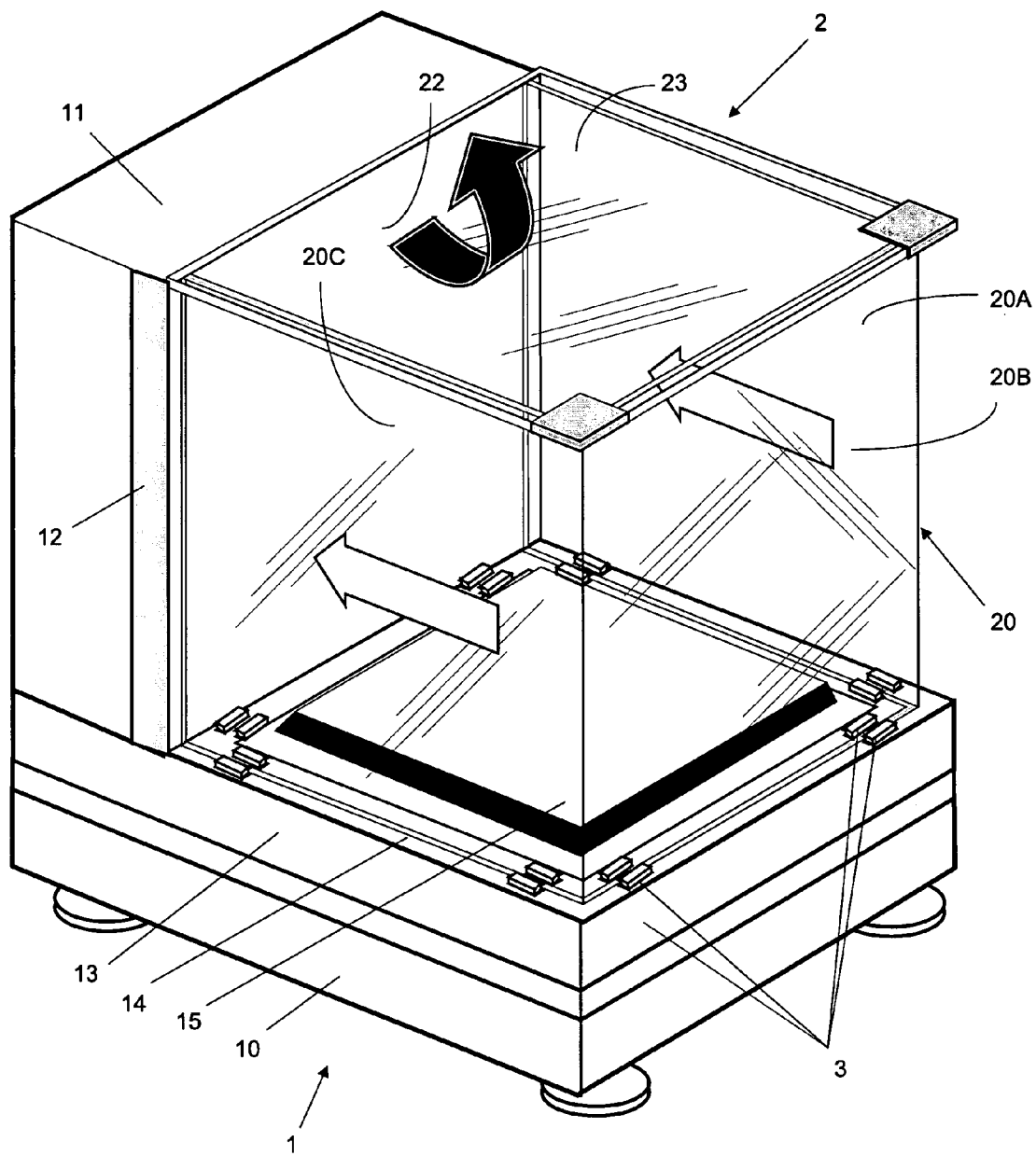
FIG. 1 represents a first embodiment of a balance in a three-dimensional view.

FIG. 1 shows a balance 1 that is equipped with a draft protection device 2 in accordance with the invention. The weighing compartment is delimited at the bottom by a weighing compartment floor 14 that forms the top of a support base 13. The top of the weighing compartment is closed off by a lid 23, the rear by a rear wall 22, and the front and sides by a U-shaped body 20. The U-shaped body 20, the lid 23, the weighing compartment floor 14 and the rear wall 22 are matched in their dimensions so that the weighing compartment is completely enclosed. With the body 20 positioned as shown in FIG. 1, one would therefore have to raise the lid 23 and access the weighing compartment from the top.

The U-shaped body 20 resting on the support base 13 has three panel elements 20A, 20B, 20C. The two legs 20A, 20C of the U-profile 1 are pointing towards the rear wall 22 and are connected by the mid-section 20C of the U-profile at the front of the weighing compartment. The legs 20A, 20C and the mid-section 20B are held in place by protrusions 3 that are arranged on the weighing compartment floor 14 on both sides of the panel elements.

As seen in FIG. 1, the balance 1 further has a balance housing 10 containing the weighing cell and weighing electronics that are not shown here. The support base 13, which has a passage opening for the load-transmitting member (not shown) connecting the weighing pan 15 to the weighing cell, is arranged here on top of the balance housing 10. The support base can be connected to the balance housing 10 by means of fasteners, or it can also be integrated in the balance housing 10. However, the support base 13, which serves primarily as a seat for the wind-blocking body 20, can also be arranged below the balance housing, for example in a configuration where the support base would serve on the one hand as a standing platform for the balance 1 and on the other hand also as a seat for the wind-blocking body 20.

As can be seen further in FIG. 1, the support base 13 arranged on the housing 10 of the balance 1 supports a chamber 11 standing in the rear part of the balance 1. The chamber 11 can contain, e.g., electronic modules or, as shown hereinafter in FIG. 3, an illumination device that illuminates the weighing-compartment rear wall 22 which forms a part of the chamber 11. The chamber 11 further has an access opening 12 which can preferably be closed off with a cover and which allows parts of the draft protection device 2 and/or a foldable version of the body 20 to be put into the chamber 11 for storage. The access opening 12 can be on the side of the chamber, or it can be on top, in which case the opening could be connected with the lid 23 for opening and closing.

Figure 2:
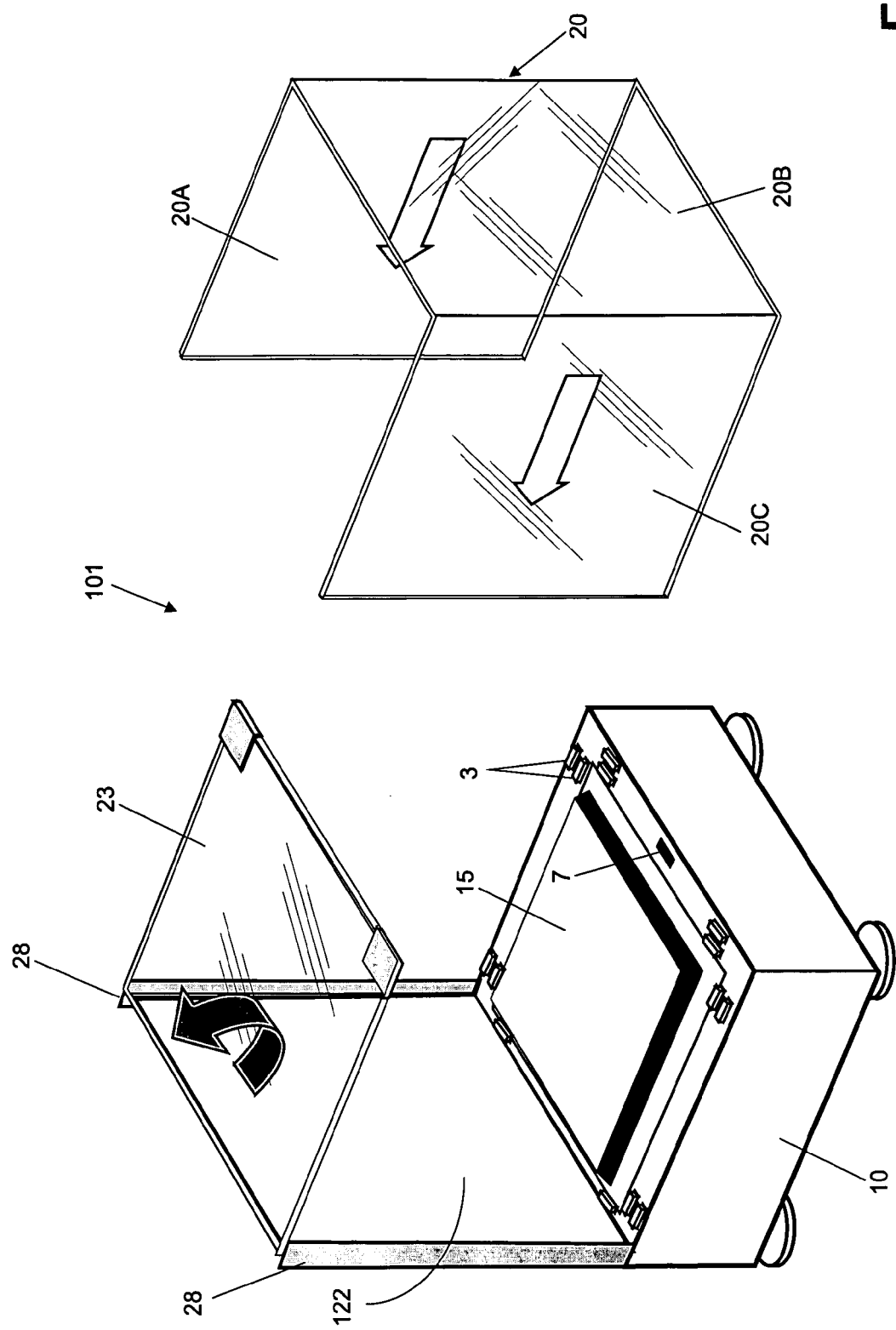
FIG. 2 represents a second embodiment of a balance in a three-dimensional view.

FIG. 2 illustrates a configuration of a balance 101, where the chamber 11 of FIG. 1 has been omitted. For better clarity, the body 20 is shown separated from the balance 101. The rear wall 122 is made of a material that diffuses the transmitted light, preferably ground glass (also called frosted glass). The rear wall 122 is held between two vertical rails 28. The rear wall panel 122 can be pulled up and out of the rails 28 and replaced by another wall panel if necessary, for example a transparent glass panel or a non-transparent metal panel. Of course, the rear wall 122 could also be fastened directly to the balance housing 10 or seated in a positioning guide on the balance housing 10. The balance shown in FIG. 2 does not have a support base.

Rather, the topside of the balance housing 10 serves as a seat for the body 20 which can be positioned in a variety of different orientations as described above.

Figure 3:
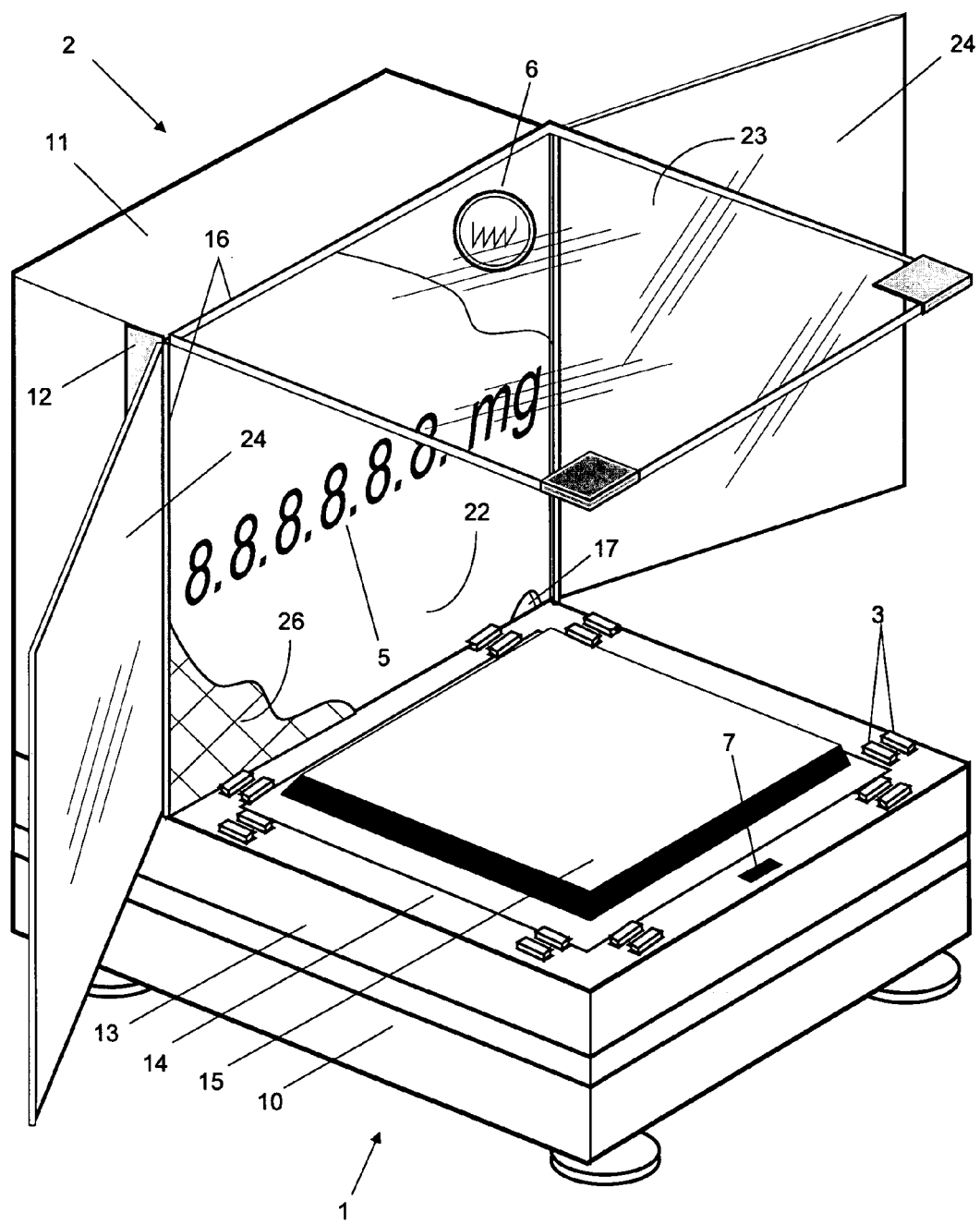
FIG. 3 represents the balance of FIG. 1, shown here with door elements installed and with a display in the rear wall.

FIG. 3 shows a balance 1 without the U-profiled body 20 which may have been removed, e.g. to clean the weighing compartment. As an addition or as an alternative to the U-shaped body 20, door elements 24 can be installed on the balance. The door elements are rotatably connected to the rear wall 22, e.g., by a hinge 16. As shown in FIG. 3, the lid 23 can likewise be attached to the rear wall 22 through a hinge 16.

Under the configuration shown in FIG. 3, the rear wall 22 is made likewise of a material 26 that diffuses the transmitted ambient light, for example a frosted glass, so that the weighing compartment is illuminated uniformly from the rear. The advantages of the light-diffusing material are on the one hand that the weighing compartment is flooded by the light from the outside and on the other hand that components located behind the rear wall 22, such as electrical modules or cables, are kept from view so that they are not creating a visual distraction.

The rear wall 22 further has at its bottom edge an opening 17 that serves as a passage for electrical cables or other conduits, for example to connect devices that are used inside the weighing compartment. The passage into the weighing compartment through the cable passage opening 17 can be facilitated in particular by a design where the rear wall 22 is removable as has been described above in the context of FIG. 2. It is also conceivable to use an arrangement of one or more cable passage openings 17 that are located at a lateral border or at the top border of the rear wall 22.

The rear wall 22 further includes a display 5, for example a backlit liquid crystal display, a feature that is particularly advantageous in combination with the inventive draft protection device 2. The display 5 provided in the rear wall 22 can, for example, indicate the weighing result. This is very convenient when carrying out a weighing procedure, because the display 5 as well as the weighing pan 15 with the material being weighed are simultaneously within the viewing field of the user of the balance.

Displays using LCDs (liquid crystal devices) and LEDs (light-emitting diodes) as well as their associated electronic circuits are described, e.g., in reference [6], Mool C. Gupta, Handbook of Photonics, CRC Press, Boca Raton 1997, pages 782-793, and in reference [7], U. Tietze, Ch. Schenk, Halbleiterschaltungstechnik (Semiconductor Circuit Design), $11^{th}$ edition, $2^{nd}$ printing, published by Springer Verlag, Berlin 1999, pages 1126-1129 and 1307-1308.

As illustrated in FIG. 3, there can be sensors 7, for example switches or optoelectronic components, to automatically detect the selected position of the body 20 shown in FIGS. 1 and 2. If more than one body 20 is provided for the balance, the sensors 7 may serve to detect which of the bodies 20 is installed. The controllable elements of the balance 1, motor-driven wind-blocking elements, for example the lid 23 or the door elements 24, the illumination device 6 or the display 5, can thus be actuated in accordance with the selected position of the body 20, so as to optimize the level of convenience for the user. Optoelectronic components for use as light sensors or photo-electric detectors are described for example in reference [6], pages 301-302 and in reference [7], pages 1299-1306.

If the draft protection device 2 is not needed, the component parts of the device, i.e., the U-shaped body 20, the lid 23 and the door elements 24, can be removed by a simple manual procedure, and at least some of the parts can be stored in the chamber 11, as already mentioned above. To admit the light from the rear into the weighing compartment, it is further advantageous if the exterior wall (not shown in the drawing) of the chamber 11, on the opposite side from the rear wall 22, is likewise made of frosted glass. Alternatively, one could also use clear glass for the exterior wall.

The panel elements 20A, 20B, 20C of the body 20 can have a diversity of shapes and can be made of a variety of transparent and/or opaque and/or light-diffusing materials such as clear glass, ground or frosted glass, plastic, and/or metal. As an example, it is also possible to use glass panels or plastic panels set in metal frames or corner profiles. Preferably, the panel elements 20A, 20B, 20C have plane surfaces, but they can also have curved shapes.

Figure 4:
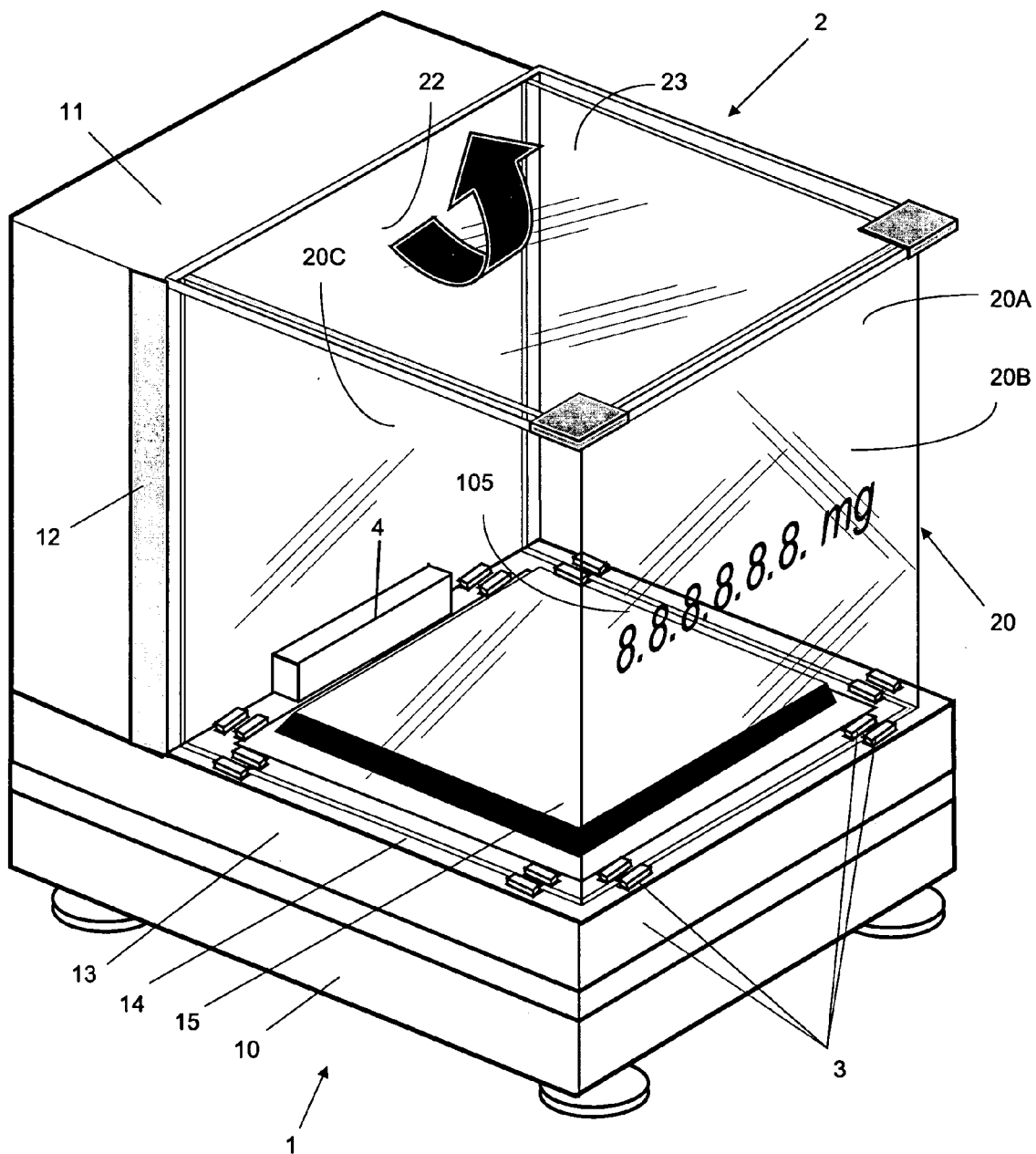
FIG. 4 represents the balance of FIG. 1, shown with a display in the front wall.

FIG. 4 shows the balance that was presented above in FIG. 1, with the addition of a display 105 on the front wall panel 20B of the balance 1. The display 105 can be realized as a projected display, in which case at least a portion of the front wall panel 20B needs to have a certain amount of diffusiveness for light in order to make the projection visible, while still being sufficiently transparent to allow a clear view of the balance pan 15. A projection device 4 to produce the display 105 can be arranged in the weighing compartment near the rear wall 22, or behind the rear wall 22. In particular, the projection device could be designed to allow the user to control the projection by varying the sharpness of the image as well as the position of the image, in particular the height from the weighing compartment floor.

As an alternative to a projected display, it is conceivable to design at least a portion of the front wall panel as a transparent liquid crystal display, i.e., containing a liquid crystal device that has transparent electrodes and is controlled in such a manner that the continuously updated weighing result is displayed. This display configuration is particularly well suited for a balance with a fixed front wall.

With the display arrangement of the foregoing description, a user of the balance will be able, for example, to focus on the process of adding sample substance to a measuring container on the weighing pan 15 and at the same time to observe the continuously updated weighing result in the display 105 without having to alternate between looking at the weighing pan and watching a display on an indicating/operating unit.

The draft protection device of the present invention has been described and illustrated in preferred configurations. However, guided by the teachings of the invention, persons of ordinary skill in the art will be able to realize further embodiments. In particular, the body or bodies of the draft protection element could be designed with different shapes and materials. It is further considered self-evident that the housing of the balance, too, could have a different shape.

LIST OF REFERENCE SYMBOLS 1, 101 balance
2 draft protection device
3 fastening means, protrusions
4 projection device
5, 105 display
6 illumination device
7 sensor
10 housing
11 chamber
12 access opening to chamber 11
13 support base
14 weighing compartment floor
15 weighing pan
16 hinge
17 cable passage opening
20 body
20A, 20B, 20C elements of body 20
22, 122 rear wall
23 lid
24 door elements
26 material of rear wall
28 rails.

REFERENCES

[1] Swiss Patent CH 677 029 A5
[2] Swiss Patent CH 687 836 A5
[3] Published German Patent Application DE 198 49 399 A1
[4] Published German Patent Application DE 37 41 313 A1
[5] Published German Patent Application DE 199 48 754 A1
[6] Mool C. Gupta, Handbook of Photonics, CRC Press, Boca Raton 1997
[7] U. Tietze, Ch. Schenk, Halbleiterschaltungstechnik (Semiconductor Circuit Design), $11^{th}$ edition, $2^{nd}$ printing, published by Springer Verlag, Berlin 1999.

The invention claimed is:

1. A balance comprising:
   a weighing compartment;
   a draft protection device that encloses the weighing compartment;
   a balance pan arranged inside the weighing compartment; and
   a rear wall delimiting the weighing compartment on one side, wherein the rear wall comprises frosted glass.

2. The balance according to claim 1, wherein:
   the weighing compartment has a weighing compartment floor; and
   the rear wall is arranged to stand substantially vertically on the weighing compartment floor.

3. The balance according to claim 2, further comprising:
   a balance housing having a topside that forms the weighing compartment floor.

4. The balance according to claim 1, further comprising:
   an illumination device operable to illuminate the rear wall.

5. The balance according to claim 1, further comprising:
   a display on the rear wall.

6. The balance according to claim 5, wherein:
   the display comprises a backlit liquid crystal display.

7. The balance according to claim 1, wherein:
   the rear wall is removable and interchangeable against another rear wall.

8. The balance according to claim 1, wherein:
   the draft protection device comprises a wind blocking body having at least two panel elements reaching partially around the weighing compartment, wherein the wind blocking body can be selectively positioned by hand in at least two differently oriented positions, and wherein, in each of the differently oriented positions, at least one opening is made available to give access to the weighing compartment from a different direction.

9. The balance according to claim 8, wherein:
the draft protection device further comprises movable wind-blocking elements operable to at least partially open and close openings in the weighing compartment.

10. The balance according to claim 9, wherein:
the movable wind-blocking elements include a lid that is hinged on the rear wall.

11. The balance according to claim 9, wherein:
the movable wind-blocking elements are selected from the group consisting of swiveling and sliding door elements.

12. The balance according to claim 9, further comprising:
a chamber connected to the rear wall, wherein at least one of the movable wind-blocking elements can be stored in the chamber.

13. The balance according to claim 8, further comprising:
a chamber connected to the rear wall, wherein the wind-blocking body is foldable and can be stored inside the chamber.

14. The balance according to claim 8, further comprising:
detector means selected from the group consisting of sensors, switches, and opto-electronic components, wherein said detector means are operable to detect at least one of a) whether the wind-blocking body is present and b) which of said at least two differently oriented positions has been selected.

15. The balance according to claim 8, wherein:
the at least two panel elements include a front wall panel and the balance further comprises a projection device operable to project a display onto the front wall panel.

16. The balance according to claim 8, wherein:
the at least two panel elements include a front wall panel, and wherein said front wall panel comprises a display formed by a liquid crystal display device that is integrated in the front wall panel.

* * * * *

UNITED STATES PATENT AND TRADEMARK OFFICE
CERTIFICATE OF CORRECTION

PATENT NO. : 7,423,226 B2 Page 1 of 1
APPLICATION NO. : 10/993098
DATED : September 9, 2008
INVENTOR(S) : Rotach et al.

It is certified that error appears in the above-identified patent and that said Letters Patent is hereby corrected as shown below:

Item (75) on the title page, please delete "Jean-Christophe Emery, Schworzenbach (CH)" and insert -- Jean-Christophe Emery, Zürich (CH) --.

Signed and Sealed this

Twenty-eighth Day of October, 2008

JON W. DUDAS
*Director of the United States Patent and Trademark Office*